United States Patent [19]
Ware, deceased

[11] 3,761,791
[45] Sept. 25, 1973

[54] VARIABLE CONDENSER COMPASS AUTOPILOT FOR MARINE VESSELS INCLUDING A REMOTE HELM MOTOR AND A LOCAL FOLLOWUP MOTOR

[76] Inventor: Paul Ware, deceased, late of 4131 El Prado Blvd., Coconut Grove, Fla. 33133 by Josephine Varney Ware, executrix

[22] Filed: Dec. 10, 1971

[21] Appl. No.: 206,775

[52] U.S. Cl. ............... 318/588, 318/647, 318/662, 114/144, 318/676
[51] Int. Cl. ..................... G05d 1/00, B63h 25/02
[58] Field of Search ................. 318/588, 647, 662, 318/674, 676; 114/144

[56] References Cited
UNITED STATES PATENTS
2,059,271  11/1936  Parker ............................. 318/588
3,593,093  7/1971  Bettcher ........................... 318/588
3,495,143  2/1970  Deming ............................ 318/674
2,961,592  11/1960  Ware ............................... 318/588

*Primary Examiner*—T. E. Lynch
*Attorney*—William A. Strauch et al.

[57] ABSTRACT

Disclosed is a marine autopilot including a magnetic compass. Deviations from the compass setting are sensed by a variable capacitor which forms part of a tuned oscillator circuit. The output frequency of the oscillator is directly proportional to the deviations, and through a detector and amplifier controls the extent of movement of the helm motor. Prior systems included a mechanical feedback from the helm to rebalance the compass. To overcome the length limitations of such mechanical feedback, electrical feedback including a local motor for compass rebalance is provided in this system.

5 Claims, 4 Drawing Figures

PATENTED SEP 25 1973 3,761,791
SHEET 1 OF 3
FIG. 1
FIG. 4
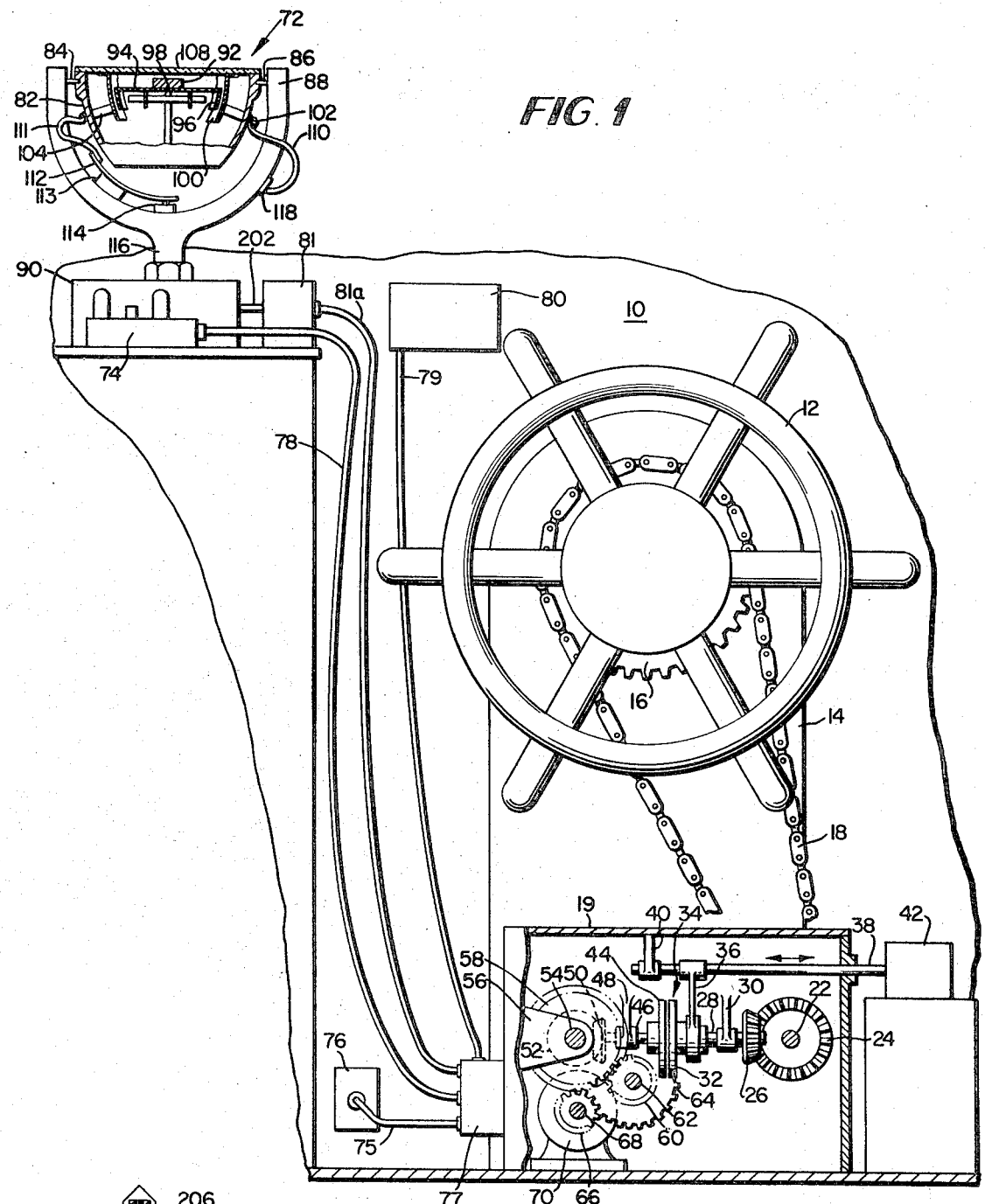
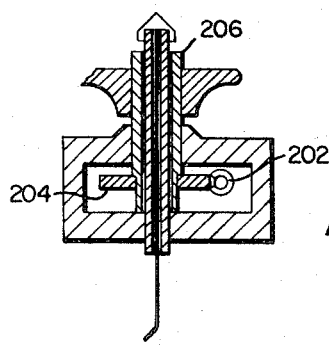

VARIABLE CONDENSER COMPASS AUTOPILOT FOR MARINE VESSELS INCLUDING A REMOTE HELM MOTOR AND A LOCAL FOLLOWUP MOTOR

BACKGROUND OF THE INVENTION

This invention relates to an automatic pilot for use in maintaining marine vessels on a preselected course and, more particularly, to a simple inexpensive compass actuated steering mechanism for marine and like vessels of all sizes that might be steered manually.

Automatic pilots of this type have been proposed and one system which has been quite successful is disclosed in U.S. Pat. No. 2,961,592 issued to the inventor of this invention. The automatic pilot described in that patent has an electrical compass pickup device which forms a variable element tuning condenser in a directly connected oscillator tube circuit that provides an output frequency which varies directly in accord with the tuned characteristics of the compass condenser. A detector tube circuit is energized by the output of the oscillator circuit and a plate type circuit relay responds to the output of the detector circuit to control the electrical supply through reversing switches to a reversible helm drive motor. Through a sprocket and chain drive assembly, the motor alternately drives the wheel or helm of a vessel in opposite directions to maintain an on course reading, and a follow up drive system extends from the helm drive system back to the yoke supporting the bowl of the compass in which the movable condenser elements are mounted, thereby readjusting the tuned characteristics of the compass condenser in accord with the corrective drive motion imparted to the helm. The follow up drive system in the patent is mechanical in nature and includes a flexible drive shaft which extends from the helm drive system to a separate gear system that drives the yoke that supports the bowl of the compass.

While the mechanical follow up drive system disclosed in U.S. Pat. No. 2,961,592 operates satisfactorily for most pilot installations, at times problems are presented by the flexible shaft after the installation has been in use for a period of time, particularly in installations where the flexible shafts are 10 feet or more long. In the pilot system described in the patent, there are various considerations which determine the length of the flexible follow up shaft. Good pilot installations require positioning of the pilot compass where it will be subjected to a minimum of magnetic interference. The power unit including the reversible helm drive motor is installed somewhere along the mechanical system between the steering wheel and the rudder and is usually, therefore, some distance from the pilot compass itself. Consequently the flexible drive shaft is often 10 feet long, and in many boats the flexible shaft may be 15 feet or more.

In addition, for good steering, the length of the flexible drive shaft should be limited and shafts up to 5 feet long have performed very satisfactorily. However, when the length of the flexible drive shaft exceeds 5 feet, torsional distortion in the shaft becomes a factor and such distortion is definitely noticeable at 10 feet. At 15 feet and over, the follow up signals transmitted through the drive shaft become very ragged and poor automatic steering may result. Because of the distortion which occurs in the follow up shaft, the follow up motion transmitted to the compass is inaccurate and it becomes very difficult to maintain the desired course of the boat.

Mounting the entire pilot assembly including the compass in the stern of the vessel so as to enable use of a short follow up shaft, for example 5 feet, eliminates the error due to distortion in the shaft and provides better steering, but it also introduces the hazard of salt water corrosion as well as severe vibrations to the pilot's compass. In addition stern mounts are very expensive.

SUMMARY OF THE INVENTION

Accordingly, it is a primary object of this invention to provide a novel automatic pilot system for use in maintaining marine vessels on a preselected course and for overcoming problems associated with prior known automatic pilot systems.

Another object of this invention resides in the provision of a novel automatic pilot system which is similar to the automatic pilot system disclosed in U.S. Pat. No. 2,961,592, but represents a very definite improvement thereover by providing a novel follow up drive system to the variable compass condenser which eliminates the need of the flexible follow up shaft and thereby eliminates the distortion and inaccuracy problems created by the flexible shaft. In addition, the commercial automatic pilot systems include a course change solenoid for disengaging the flexible shaft when a change in course is made. This invention also eliminates the course change solenoid.

Still another object of this invention resides in the provision of an automatic pilot system as described in the previous objects, wherein the follow up drive system to the compass condenser is primarily electrical in nature and very accurately repositions the compass condenser in direct correspondence to the directional motion imparted to the helm by the main helm drive system. The follow up drive unit is a very compact electromechanical unit which enables the compass to be located at any position on a boat.

A further object of the invention resides in the provision of a novel automatic pilot system as described in previous objects wherein the follow up drive system to the yoke which supports the bowl of the compass and condenser plates carried thereby includes a small reversible motor and a control system therefor which drives the motor in one or the other direction in appropriate correspondence to the direction in which the main helm drive motor is driven to maintain the marine vessel on the desired predetermined course.

Another object of the invention resides in the provision of a novel automatic pilot system as described in previous objects wherein operation of the follow up drive motor is prevented when a course change is being automatically effected and automatic pilot control is immediately resumed following the course change.

Still further objects and advantages of the invention will become more apparent from reading the following detailed description of a preferred embodiment of the invention as it relates to the accompanying drawings wherein like numerals indicate like elements throughout.

BRIEF DESCRIPTION OF DRAWINGS

FIG. 1 is a fragmentary elevation view of the novel automatic pilot system of the invention as applied to the helm of a boat;

FIG. 4 is a fragmentary showing of the drive connection between the follow up system of FIG. 3 and the yoke which supports the bowl of the compass.

DETAILED DESCRIPTION OF THE INVENTION

Figure 2:
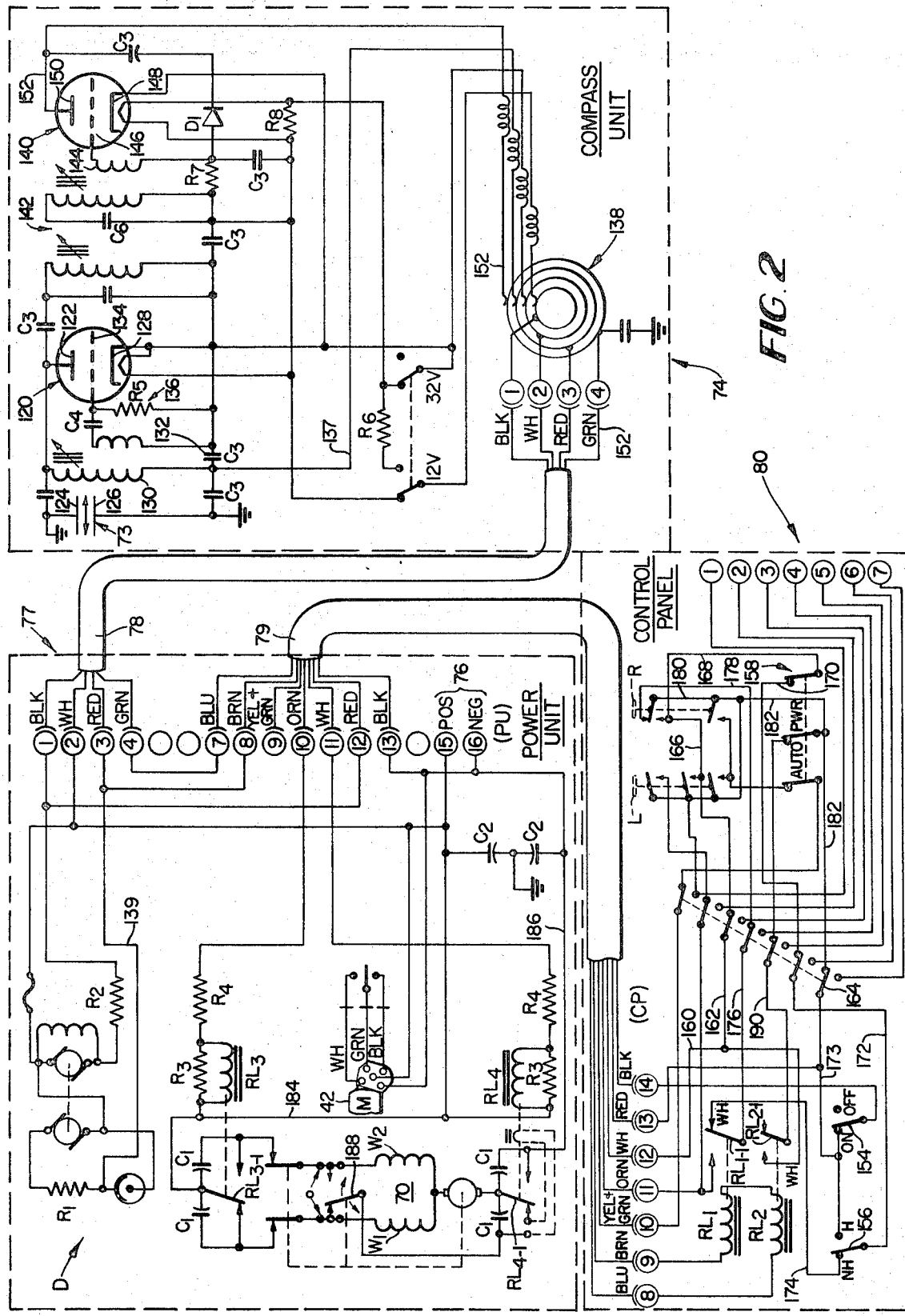
FIG. 2 illustrates the circuitry in the main power unit, the compass unit (oscillator and detector circuits), and the control panel in a conventional automatic pilot system produced by the inventor.

Referring now to FIG. 1 the general characteristics and operation of the autmatic pilot will be described as it is applied to a boat 10 which has a helm 12 mounted on a standard 14. The helm 12 is provided with a gear 16 that is drivingly connected by means of a chain 18 to a drive gear (not shown). The drive gear is in turn actuated by the shaft 22 which has a bevel gear 24 mounted thereon in engagement with a mating bevel gear 26. The gear 26 is mounted on a shaft 28 which may be supported in any suitable manner such as by a bearing in bracket 30. The shaft 28 has mounted on its end thereof one plate 32 of a clutch 34 and this clutch plate 32 is actuated by means of an arm 36 which is attached to a clutch bar 38 and suitably actuated by the clutch motor 42. The other plate 44 of the clutch 34 is carried by a shaft 46 supported by a bracket 48 and the shaft 46 carries on its stem a bevel gear 50. The bevel gear 50 meshes with a further bevel gear 52 carried on a shaft 54 mounted in brackets 56 and driven by the gear 58. The gear 58 is in turn driven by gear 60 mounted on shaft 62 and fixed to gear 64. Gear 64 is driven by pinion 66 mounted on shaft 68 of a reversible helm drive motor 70.

When the clutch motor 42 is actuated to shift rod 38 to its left-most position, the two plates 32 and 44 of clutch 34 are in engagement and the helm 12 is driven by the helm drive motor 70. When the clutch motor 42 is deenergized, the clutch 34 is disengaged and the helm 12 may be controlled manually.

Also shown in FIG. 1 are a compass 72 and an oscillator-detector unit 74. A power cable 75 is provided to supply power from a battery supply 76 to main power unit 77 from which power is supplied to the helm drive motor 70 by way of suitable electrical means. An electrical cable 78 provides the necessary power supply for the oscillator-detector unit 74 from the power unit 77. Also, an electrical cable 79 extends from the control panel 80 to the main power unit 77 to enable operator control over the entire pilot system.

The construction thus far described corresponds essentially to the construction described and illustrated in FIG. 1 of U.S. Pat. No. 2,961,592. As pointed out previously, the novelty and significant improvement which constitutes the invention herein comprises the electrical follow up drive system 81 which is connected to the main power unit 77 by way of electrical cable 81a, with the follow up unit 81 including a small reversible motor 200 (FIG. 3) which through its shaft 202 drives the yoke 88 that supports the bowl 82 of the compass to restore the untuned compass condenser to its tuned condition representing the desired on course setting. The details of the novel follow up drive system will be described hereinbelow.

The construction of compass 72 is identical to that illustrated in U.S. Pat. No. 2,961,592 and, as noted previously, the compass is fitted with a variable condenser pick off which functions as a varying sensing element in the oscillator-detector circuit compass unit illustrated in FIG. 2. The compass includes a compass bowl 82 mounted in gimbels 84 and 86 and supported in the yoke 88. The yoke is rotatably mounted in suitable bearings in a compass gear box 90 and is driven by the small reversible motor 200 which forms part of the follow up drive system 81. The compass 72 has mounted within bowl 82 a conventional compass magnetic assembly 92 to which is attached a metal vane 94 which has arcuate end plates 96 forming one side of a variable condenser 73. The magnetic and vane assembly are mounted on a conventional compass pivot 98 and the vane 94 and plates 96 are maintained in a substantially fixed position relative to the earth by the normal compass action of the pivoted magnetic assembly 92, but actually move relative to the bowl and outer plates 100 which form the outer arcuate electrodes of the variable condenser. The outer plates 100 are fixed to the bowl 82 by screws 102 and support members 104, with the screws 102 also serving as plate terminals to which suitable flexible leads 110 and 111 may be connected. The other end of lead 111 opposite terminal 102 is connected to a spring 112 mounted on yoke 88 by means of an insulator block 113 and one end of the spring 112 bears on the vertical fixed spindle contact 114 which passes through the stem 116 of the rotatable yoke 88. The other outer plate lead 110 may be connected at 118 to yoke 88 and then to the various metal connections to ground in the oscillator circuit. As stated previously, the construction of compass 72 and its plate components which form a variable condenser is identical to that illustrated in U.S. Pat. No. 2,961,592 to which reference may be made for a more detailed explanation of the construction and operation of the compass.

Referring now to FIG. 2, the compass condenser 73 serves as the variable sensing element in the tuned plate type oscillator which is part of the circuit 74 and which is formed by triode 120 whose plate 122 is connected to one terminal 124 of the compass condenser 73. The other plate 126 of condenser 73 is connected to ground. The other cathode 128 of tube 122 is connected to ground and a tank coil 130 is connected between plate 122 and cathode 128 through a coupling and bypass condenser 132. Voltage is supplied to grid 134 via a grid supply circuit 136. Positive plate supply voltage for the oscillator is provided through lead 137 which is connected through contactor 138 to the output line 139 of dynamometer D.

Output from the tuned plate oscillator is fed to a detector triode 140 by way of transformer 142 which has its secondary output winding 144 connected to the grid 146 of detector triode 140. Thus, the current flow from cathode 148 to plate 150 of tube 140 is controlled by the bias imposed on grid 146 from winding 144 and, accordingly, by the output from oscillator 120. The plate current from plate 150 of detector tube 140 is connected by way of lead 152 to contactor 138 and thence in series with relays RL1 and RL2 to appropriately energize one or both of the relays and thereby determine the direction in which motor 70 is driven to provide the necessary correctional steering to helm 12. Relays RL1 and RL2 are constructed to pull in and drop out at different current values. For a low plate current, neither relay is energized. For an intermediate plate current only relay RL1 is energized, and for a high plate current both relays are energized.

Operation of the oscillator and detector circuit is as follows. By means of the iron slug in tank coil 130, the oscillator will be tuned to a preselected frequency with compass condenser 73 in its minimum capacity condition, as for example, a frequency of 20 megacycles. With the condenser 73 in its minimum capacity position and the oscillator tuned to its preselected frequency, plate current from detector tube 140 will be at a maximum. When condenser 73 is shifted to its maximum capacity position, the oscillator will oscillate at a lower frequency than the tuned frequency, for example, at about 19 megacycles, and the detector plate current will be at a minimum.

The circuitry of FIG. 2 is conventional and operates in essentially the same manner as the circuitry described in U.S. Pat. No. 2,961,592 and therefore its operation in controlling motor 70 and automatically steering helm 12 will only be briefly described herein. In the control panel unit 80, assume switch 154 is "On" and switch 156 is in the "Non-hunting (NH)" position which corresponds to an operating mode in which the helm motor 70 is either driving in one or the other direction, or is in a neutral "off" position in which the boat is on course. In an alternate mode of operation, wherein switch 156 is in a "Hunt (H)" position, motor 70 will continually oscillate or hunt back and forth within a predetermined symmetrical range to maintain the desired course. Assume also that the ganged switches 158 are in their closed "Auto-Power" position.

The helmsman initially sets a desired course for the boat by manual adjustment of the wheel or helm 12 while clutch motor 42 is deenergized and clutch 34 is disengaged. To place the boat under automatic control, clutch motor 42 is energized by actuation of a manual switch at the control panel to engage clutch 34 and thereby drive helm 12 from motor 70. In the non-hunting (NH) mode of operation, the automatic pilot operates between the two extreme oscillating frequencies or plate detector current values about a mean or neutral frequency or current value which corresponds to the desired set course. In other words, for small currents in the detector plate circuit corresponding to a maximum capacitance condition of compass condensor 73, both relays RL1 and RL2 will be deenergized and the rudder will be moved in one direction, as for example to the left, by rotation of motor 70 in one direction. Under these conditions, the small plate current flow at plate 150 of detector tube 140 which passes through relays RL1 and RL2 will be insufficient to energize either of these relays, and their respective relay contacts RL1-1 and RL2-1 will be positioned as shown in FIG. 2. In this position, motor 70 will be rotated in one direction because the drive motor directional relay RL3 will be deenergized and contact RL3-1 will be positioned as shown in FIG. 2 while the drive motor "on-off" relay RL4 will be energized and contact RL4-1 will be positioned to the right in its motor energizing position. This results because current will flow from the positive supply terminal PU15 through relay RL4 to terminal PU11 into terminal CP12 though lines 160, 162, closed contacts 164, lines 166, 168, closed switch 158, lines 170, 172, switch 156, line 174, relay contact RL1-1, lines 176, 178, 180, 182, 173, switch 154, terminal CP14, terminal PU13 and the negative supply terminal PU16. As relay RL4 is energized, contact RL4-1 is moved to its right position so that current will flow from terminal PU15 through line 184, contact RL3-1, motor winding W1, contact RL4-1, and line 186 to negative terminal PU16. Motor 70 will thus be driven in one direction to move the rudder back to the left, and this motion will continue until, through the follow up drive mechanism 81, the yoke 88, compass bowl 82, and condenser plates 100 have been rotated through a sufficiently angular distance to return compass condenser 73 to the predetermined, on course, intermediate or neutral capacitance condition wherein plate current from detector 140 will be at an intermediate value which is sufficiently high to energize relay RL1, but not high enough to energize relay RL2. Consequently, contact RL1-1 will be moved to its left contact position and relay RL4 will be deenergized to open contact RL4-1 to the left and stop movement of the motor 70. A brake switch 188, which is open when motor 70 is running, will be closed as the motor is deenergized to short out the motor immediately as contact RL4-1 is opened to the left.

If the boat should again veer off course so as to require correctional movement of the rudder in the other direction, that is to the right, the need for correctional movement is sensed by compass condenser 73 which will then be in its maximum capacitance position. Consequently, the plate current at detector tube 140 will be at a maximum and will be sufficiently high to energize both relays RL1 and RL2, thereby positioning both contacts RL1-1 and RL2-1 in their left contact positions. Current will thus flow from supply terminal PU15 through relay RL4, terminals PU11 and CP12, contact RL2-1, line 190, switch 158, lines 182, 173, switch 154, terminals CP14, PU13 to negative supply terminal PU16. Relay RL4 will thus be energized to move contacts RL4-1 to its right operative position. The motor directional relay RL3 will also be energized to move contact RL3-1 to the right and thereby energize winding W2 of motor 70 so that the motor is driven in its reverse direction to move the rudder to the right. Relay RL3 is energized by current flow from line 184 to terminals PU10 and CP11, contact RL1-1 in its left position, lines 176, 178, 180, 182, 173, switch 154, terminals CP14, PU13 to the negative supply terminal PU16. Motor 70 will thus be driven in its reverse direction to move the rudder to the right and this motion will continue until, through the follow up drive mechanism 81, the compass condenser 73 is returned to its intermediate, on course, capacitance condition, at which the plate current of detector tube 140 is reduced to an intermediate value at which relay RL2 will be deenergized, but relay RL1 will remain energized. Consequently, as contact RL2-1 is opened to the right, relay RL4 will be deenergized to open contact RL4-1 and thereby deenergize motor 70 and close brake switch 188.

As mentioned previously, the circuitry of FIG. 2 and the general operation just described are conventional. The novelty and improvement for which protection is sought in this application lie in the electrical follow up drive mechanism 81 and the manner in which it repositions the compass bowl 82 and compass condenser 73 in accordance with the correctional drive movement imparted to the rudder by helm motor 70. The follow up mechanism will now be described.

Figure 3:
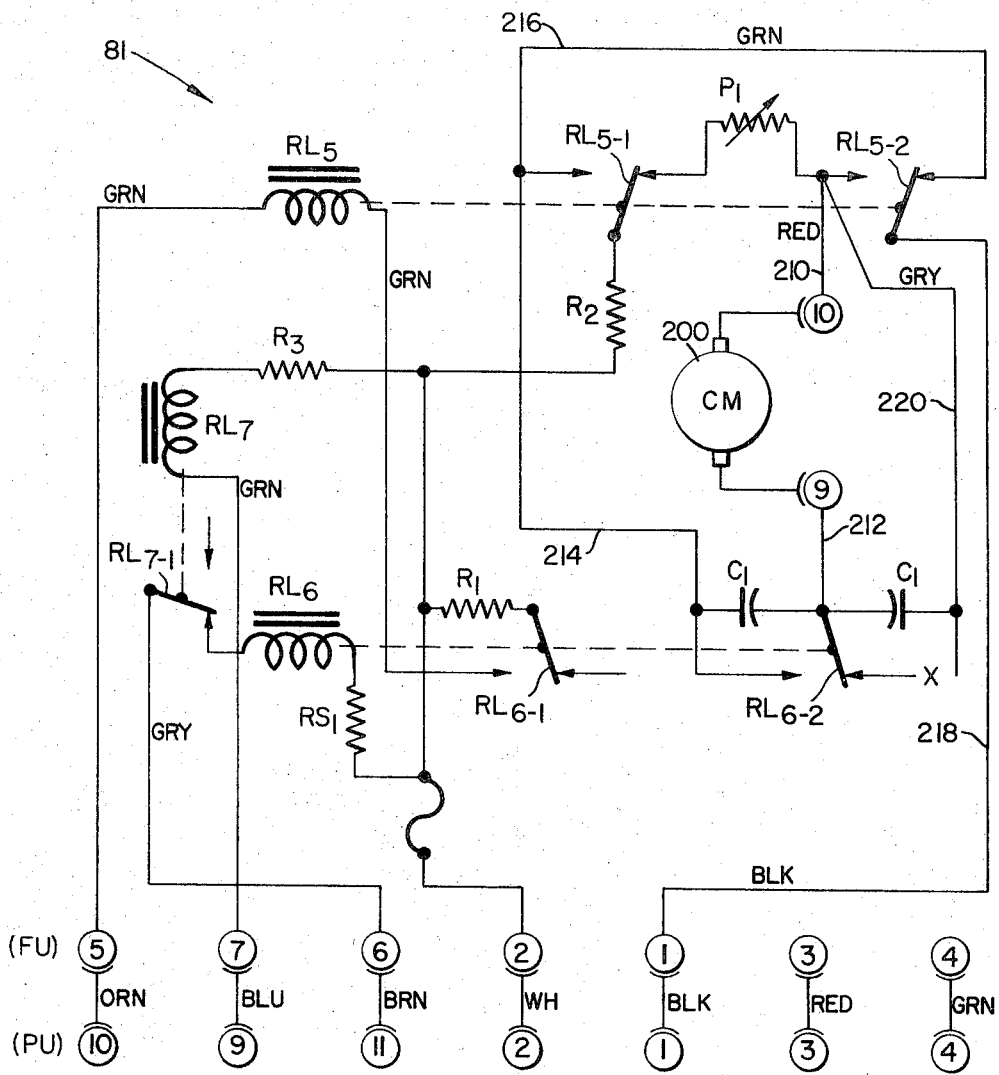
FIG. 3 is a circuit diagram of the novel follow up drive system, illustrating the manner in which it is to be connected to the power unit in the circuit of FIG. 2.

Referring to FIG. 3, the follow up (FU) terminals 1–7 will be connected to respective power unit (PU) terminals as shown in FIG. 3. Mechanism 81 includes a small 5–10 watt reversible compass motor 200 and appropriate controls therefor, with the shaft 202 of the motor 200 being drive connected through a suitable gear connection 204 with a rotatable spindle 206 to which the yoke 88 is affixed as shown schematically in FIG. 4.

The connections between the respective FU and PU terminals are such that relay RL5, which controls the direction of rotation of motor 200, will be connected between terminals PU2 and PU10 across directional relay RL3 and will be energized when that relay is energized. Also relay RL6, which controls the on-off condition of motor 200, will be connected between terminals PU2 and PU11 across relay RL4 and will be energized when that relay is energized. For example, in the condition described above wherein motor 70 is driving the rudder to the left due to the fact that relays RL1, RL2, and RL3 are deenergized and relay RL4 is energized, in FIG. 3, relay RL5 will be deenergized and relay RL6 will be energized since current will flow from terminals PU2, FU2, through RL6, closed contact RL7-1 contacts FU6, PU11 and eventually to the negative supply terminal PU16 via contact RL1-1 through the circuitry as traced above with respect to energization of relay RL4. Energization of relay RL6 moves contacts RL6-1 and RL6-2 to the left contact position, the latter contact of which causes motor 200 to be driven in one direction by current flow from positive supply terminals PU2 and FU2 through resistor R2, contact RL5-1, potentiometer P1, line 210, terminal FU10 connected to one side of motor 200, line 212, contact RL6-2, lines 214 and 216, contact RL5-2 and line 218 to terminals FU1 and PU1 and eventually to negative supply terminal PU16 through switch 154 (FIG. 2). Motor 200 will be energized to drive yoke 88 and bowl 82 and thereby adjust compass condenser 73 back to its on course position. When this occurs, as described above, relay RL1 is energized to deenergize relay RL4 and helm drive motor 70. Simultaneously therewith energization of relay RL1 causes deenergization of relay RL6 to stop motor 200 and contact RL6-2 shifts to the right and shorts out motor 200 via line 220. Adjustment of compass condenser 73 is thus stopped.

In the other situation described above wherein motor 70 is driving the rudder to the right due to the fact that relays RL1 RL2, RL3 and RL4 are energized, both relays RL5 and RL6 in FIG. 3 will be energized and compass motor 200 will be rotated in its opposite direction. Relay RL5 is energized because current flows from positive supply terminals PU2, FU2 through resistor R1, contact RL6-1 in its left position, relay RL5 to terminals FU5 and PU10, and from there eventually to negative supply terminals PU16 through the circuitry described above with respect to energization of relay RL3. With both relays RL5 and RL6 energized, current flows from terminals PU2, FU2 through contact RL5-1 in its left position, line 214, contact RL6-2 in its left position, line 212, terminal FU9 into the other side of motor 200, line 210, contact RL5-2 in its left position, and line 218 to terminals FU1, PU1, and eventually to negative supply terminal PU16 through switch 154. Motor 200 will be driven in its opposite direction of rotation until compass condenser 73 is adjusted back to its on course position, at which time relay RL2 is deenergized to deenergize relay RL4 and stop motor 70. Simultaneously relay RL6 will be deenergized to deenergize relay RL5 and motor 200, thereby stopping adjustment of compass condenser 73.

Relay RL7 (FIG. 3) is energized to open contact RL7-1 and prevent energization of compass motor 200 when a course change is desired and accomplished by depressing either of the manual pushbutton switches "L" (left) or "R" (right) in FIG. 2 which enables the course of a boat to be changed automatically without disengaging clutch 34 and manually steering wheel 12. Thus, the rudder is moved to the left or right as desired, without any follow up being transmitted to compass motor 200. When the course change has been made and the L or R button is released, relay RL7 is deenergized and the automatic pilot immediately resumes control of the boat to maintain the newly set course.

Potentiometer P1 is provided in FIG. 3 to produce a reasonable balance between right and left speeds of compass motor 200 during initial installation of the pilot assembly.

While the novel follow up system has been described for use in an installation wherein there is a mechanical drive connection between the steering wheel and the rudder, it is to be understood that the system may also be readily incorporated into an installation wherein the wheel drives the rudder through a hydraulically operated drive system. In the hydraulic type of installation the right/left signal source for relay RL5 in FIG. 3 will come from a friction switch which is usually mounted in direct mechanical relationship to the rudder. In addition, a short delay, for example 1 or 2 seconds, is introduced into the motor control circuit to allow time for current reversals of the friction switch signals at the rudder. Operation of an hydraulic installation is such that when the boat veers from the set course, the compass condenser will deviate from its predetermined on course setting and will send error signals to the drive motor 70 for corrective rudder motion. The consequent motion of the rudder friction switch will give the directional signal to relay RL5 to move the compass bowl in the opposite direction and when the desired compass gap is reached again, the drive motor will be deenergized, unless the boat is swinging, in which case both the error and follow up signals will cooperate to bring the boat rapidly back on its set course. In the hydraulic version, the error signal will come from the compass, whereas the follow up signal will come from the rudder. The compass will determine the polarity of relay RL3 in FIG. 2 to cause the drive motor 70 to effect corrective rudder movement. Then the motion of the rudder determines the polarity of its cooperating friction switch to give the desired polarity to relay RL5 to move the compass bowl in the opposite direction so that when a predetermined on course compass gap is again attained, the drive motor will be stopped.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An automatic pilot comprising a magnetic compass, a variable condenser assembly actuated by said compass and including first capacitor element means mounted on an adjustable support and second capacitor element means fixed to the movable portion of said compass, a reversible helm drive motor, control means responsive to said variable condenser assembly for controlling opertion of said helm drive motor to provide corrective helm drive motion when necessary to maintain a predetermined set course, and an electrically operated follow-up drive system including a reversible follow-up motor drive connected to said support and operated in response to operation of said helm drive motor for adjusting said support, said follow-up motor causing said support to rotate in a certain direction upon rotation of said helm drive motor in one direction and causing said support to rotate in an opposite direction upon rotation of said helm drive motor in an opposite direction, thereby providing follow-up motion to said variable condenser assembly when said helm drive motor is operated.

2. An automatic pilot as defined in claim 1, said follow up drive system including relay means actuated upon rotation of said helm drive motor to energize said follow up motor and thereby adjust said support.

3. An automatic pilot as defined in claim 1, said control means comprising a variable frequency oscillator operated in response to said variable condenser assembly, detector means receiving the output from said oscillator, first relay means connected to and controlled by said detector means, circuit means actuated by said first relay means for controlling operation of said helm motor, and said follow up drive system including second relay means actuated by said first relay means to drive said follow up motor when said helm drive motor is driven.

4. An automatic pilot as defined in claim 3, said circuit means including an on-off relay for energizing said helm drive motor and a directional relay for controlling the direction in which said helm drive motor rotates, said second relay means of said follow up drive system including an on-off relay for energizing said follow up motor and a directional relay for controlling the direction in which said follow up motor rotates, the on-off and directional relays of said follow up system being connected across the on-off and directional relays, respectively, of said circuit means so that said follow up motor is rotated in response to rotation of said helm drive motor.

5. An automatic pilot as defined in claim 5, said control means comprising manual switch means operable to energize said helm drive motor and effect a course change as desired, and said follow up drive system including means responsive to actuation of said manual switch means to prevent energization of said follow up motor as said course change is being effected.

* * * * *

UNITED STATES PATENT OFFICE
CERTIFICATE OF CORRECTION

Patent No. 3,761,791  Dated September 25, 1973

Inventor(s) Paul Ware, deceased (Josephine Varney Ware, Executrix)

It is certified that error appears in the above-identified patent and that said Letters Patent are hereby corrected as shown below:

Column 9, line 10, (Claim 1) change "opertion" to --operation--.

Column 10, line 22 (Claim 5) change "5" to --1--.

Signed and sealed this 19th day of February 1974.

(SEAL)
Attest:

EDWARD M. FLETCHER, JR.
Attesting Officer

C. MARSHALL DANN
Commissioner of Patents